United States Patent
Seo

(10) Patent No.: US 11,036,103 B2
(45) Date of Patent: Jun. 15, 2021

(54) THIN FILM TRANSISTOR SUBSTRATE, LIQUID CRYSTAL DISPLAY APPARATUS INCLUDING THE SAME, AND METHOD OF MANUFACTURING SAME

(71) Applicant: Samsung Display Co., Ltd., Yongin-si (KR)

(72) Inventor: Jina Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 122 days.

(21) Appl. No.: 15/333,789

(22) Filed: Oct. 25, 2016

(65) Prior Publication Data

US 2017/0205677 A1    Jul. 20, 2017

(30) Foreign Application Priority Data

Jan. 18, 2016 (KR) .................. 10-2016-0005998

(51) Int. Cl.
 *G02F 1/1362* (2006.01)
 *G02F 1/1343* (2006.01)
 *G02F 1/1368* (2006.01)

(52) U.S. Cl.
 CPC ...... *G02F 1/136286* (2013.01); *G02F 1/1368* (2013.01); *G02F 1/13439* (2013.01); *G02F 1/136227* (2013.01); *G02F 1/136222* (2021.01); *G02F 1/136295* (2021.01); *G02F 2201/123* (2013.01)

(58) Field of Classification Search
 CPC ......... G02F 1/133514; G02F 1/133516; G02F 1/136213; G02F 1/136227; G02F 2001/136222
 See application file for complete search history.

(56) References Cited

U.S. PATENT DOCUMENTS

| | | | |
|---|---|---|---|
| 7,339,639 B2 | 3/2008 | Nakano et al. | |
| 7,612,860 B2 | 11/2009 | Kim et al. | |
| 9,274,368 B2 | 3/2016 | Hui | |
| 2005/0151901 A1 | 7/2005 | Kikkawa et al. | |
| 2005/0270445 A1 | 12/2005 | Lee et al. | |
| 2006/0250536 A1* | 11/2006 | Kim ................. | G02F 1/136209 349/43 |
| 2006/0285062 A1 | 12/2006 | Kim et al. | |
| 2009/0268146 A1 | 10/2009 | Kook et al. | |
| 2010/0001276 A1* | 1/2010 | Kim ................. | G02F 1/136227 257/59 |
| 2011/0049519 A1* | 3/2011 | Kim ................. | G02F 1/13624 257/59 |
| 2014/0098315 A1* | 4/2014 | Jung ................ | G02F 1/136209 349/42 |

(Continued)

FOREIGN PATENT DOCUMENTS

| CN | 1497316 | 5/2004 |
|---|---|---|
| CN | 1624548 | 6/2005 |
| CN | 103325732 | 9/2013 |

(Continued)

*Primary Examiner* — Angela K Davison
(74) *Attorney, Agent, or Firm* — H.C. Park & Associates, PLC

(57) ABSTRACT

An apparatus and method for making a liquid crystal display (LCD) in which a thin film substrate includes a separately formed partition wall to more easily control the sizes of through-holes formed in a color filter of the LCD.

12 Claims, 14 Drawing Sheets

(56) References Cited

U.S. PATENT DOCUMENTS

2014/0368770 A1    12/2014  Chae et al.

FOREIGN PATENT DOCUMENTS

| KR | 10-2005-0112020 | 11/2005 |
| KR | 10-2006-0131319 | 12/2006 |
| KR | 10-2009-0112181 | 10/2009 |
| KR | 10-2014-0145723 | 12/2014 |

* cited by examiner

THIN FILM TRANSISTOR SUBSTRATE, LIQUID CRYSTAL DISPLAY APPARATUS INCLUDING THE SAME, AND METHOD OF MANUFACTURING SAME

CROSS-REFERENCE TO RELATED APPLICATION

This application claims priority from and the benefit of Korean Patent Application No. 10-2016-0005998, filed on Jan. 18, 2016, which is hereby incorporated by reference for all purposes as if fully set forth herein.

BACKGROUND

Field

Exemplary embodiments of the invention relate generally to a thin film transistor substrate, and, more particularly, to a liquid crystal display apparatus including the same, and a method of manufacturing same.

Discussion of the Background

Since certain liquid crystal display apparatus have advantages, such as low operating voltage and low power consumption that make it suitable for a portable use, the liquid crystal display apparatus is widely used over a variety of fields, such as a notebook computer, a monitor, a spacecraft, and an airplane.

The liquid crystal display apparatus includes a liquid crystal (LC) layer disposed between two substrates, and displays an image by adjusting an arrangement state of the LC layer according to the magnitude of an electric field applied thereto, and thus, adjusts the transmittance of light.

Generally, since a thin film transistor is formed on a lower of two substrates, the lower substrate is referred to as a thin film transistor substrate. On the other hand, since a color filter is formed on an upper substrate, the upper substrate may be referred to as a color filter substrate.

However, when the color filter substrate and the thin film transistor substrate are separately manufactured and then attached together, there have been complexities during the manufacturing process and including difficulties in aligning the two substrates.

To overcome the foregoing manufacturing disadvantages, a liquid crystal display apparatus that has a color filter disposed on a thin film transistor substrate to more simplify the manufacturing process and improve alignment have been proposed. When the color filter is disposed on the thin film transistor substrate, the color filter generally includes a hole for electric connection between circuit components, such as a pixel electrode and a thin film transistor.

The hole may be formed via conventional lithographic exposure and developing processes while the color filter is manufactured, but it is typically difficult to control a size of the hole due to over-exposure or non-exposure.

The above information disclosed in this Background section is only for enhancement of understanding of the context of the inventive concept, and, therefore, may contain information that does not form the prior art that is already known in this country to a person of ordinary skill in the art.

SUMMARY

One or more exemplary embodiments of the invention provide a thin film transistor substrate, a liquid crystal display apparatus including the same, and a method of manufacturing same, which may easily control a size of a hole formed in a color filter.

According to one or more exemplary embodiments, a thin film transistor substrate includes a gate line extending in a first direction, a first data line and a second data line extending in a second direction crossing the first direction, a first thin film transistor electrically connected to the gate line and the first data line, a second thin film transistor adjacent to the first thin film transistor, a color filter layer covering the first thin film transistor and the second thin film transistor, the color filter layer having a first color and a through-hole formed therein, a first pixel electrode disposed on the color filter layer and electrically connected to the first thin film transistor, a second pixel electrode disposed on the color filter layer and electrically connected to the second thin film transistor, and a partition wall formed separately from the color filter layer and disposed inside the through-hole and spatially dividing the through-hole, such that at least two sub-holes separated from each other are formed in the through-hole by the partition wall, in which the first pixel electrode is connected to the first thin film transistor exposed via a first one of the at least two sub-holes and the second pixel electrode is connected to the second thin film transistor exposed via a second one of the at least two sub-holes.

The partition wall may have a second color different from the first color.

An end of the partition wall may overlap an end of the color filter layer that is adjacent to the through hole.

The first pixel electrode may be disposed adjacent to the gate line between the first data line and the second data line, the second pixel electrode may be disposed adjacent to the gate line between the first data line and the second data line in a position adjacent to the first pixel electrode, and the gate line may be disposed between the first pixel electrode and the second pixel electrode.

The second thin film transistor may be electrically connected to the gate line and the first data line.

The first pixel electrode may include a high pixel electrode, and the second pixel electrode may include a low pixel electrode.

The thin film transistor substrate may further include a first storage line disposed below the color filter layer and adjacent to the first pixel electrode, and a second storage line may be disposed below the color filter layer and adjacent to the second pixel electrode.

The thin film transistor substrate may further include a first metallic layer disposed on the color filter layer and electrically connected to the first storage line, and a second metallic layer disposed on the color filter layer and electrically connected to the second storage line.

The through hole may further include a third sub-hole and a fourth sub-hole separated by the partition wall, the first metallic layer may be connected to the first storage line via the third sub-hole, and the second metallic layer may be connected to the second storage line via the fourth sub-hole.

The second thin film transistor may be electrically connected to the gate line and the second data line.

According to one or more embodiments, a liquid crystal display apparatus may includes the thin film transistor substrate described above, a counterpart substrate facing the thin film transistor substrate, and a liquid crystal layer disposed between the thin film transistor substrate and the counterpart substrate.

According to one or more exemplary embodiments, a method of manufacturing a thin film transistor substrate includes forming a first thin film transistor and a second thin film transistor adjacent to each other on a substrate, forming a color filter layer covering the first thin film transistor and the second thin film transistor, the color filter layer having a first color and a through-hole therein, after the through-hole is formed, forming a partition wall inside the through-hole, the partition wall dividing the through-hole into at least two sub-holes, forming a first pixel electrode connected to the first thin film transistor exposed via a first one of the at least two sub-holes, and forming a second pixel electrode connected to the second thin film transistor exposed via a second one of the at least two sub-holes.

The partition wall may include pigment of a color different from the first color.

An end of the partition wall may overlap an end of the color filter layer that is adjacent to the through hole.

The first thin film transistor and the second thin film transistor may be electrically connected to the same gate line and the same data line.

The method may further include forming a first storage line adjacent to the first pixel electrode, and forming a second storage line adjacent to the second pixel electrode.

The first storage line and the second storage line may be disposed between the substrate and the color filter layer.

The method may further include forming a first metallic layer and a second metallic layer on the color filter layer.

The through hole may further include a third sub-hole and a fourth sub-hole separated from each other by the partition wall, the first metallic layer may be connected to the first storage line via the third sub-hole, and the second metallic layer may be connected to the second storage line via the fourth sub-hole.

The first thin film transistor and the second thin film transistor may be electrically connected to the same gate line.

According to exemplary embodiments, the size of a hole formed in a color filter may be easily controlled.

Additional aspects will be set forth in the detailed description which follows, and, in part, will be apparent from the disclosure, or may be learned by practice of the inventive concept The foregoing general description and the following detailed description are exemplary and explanatory and are intended to provide further explanation of the subject matter of invention, which is defined solely by the appended claims.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
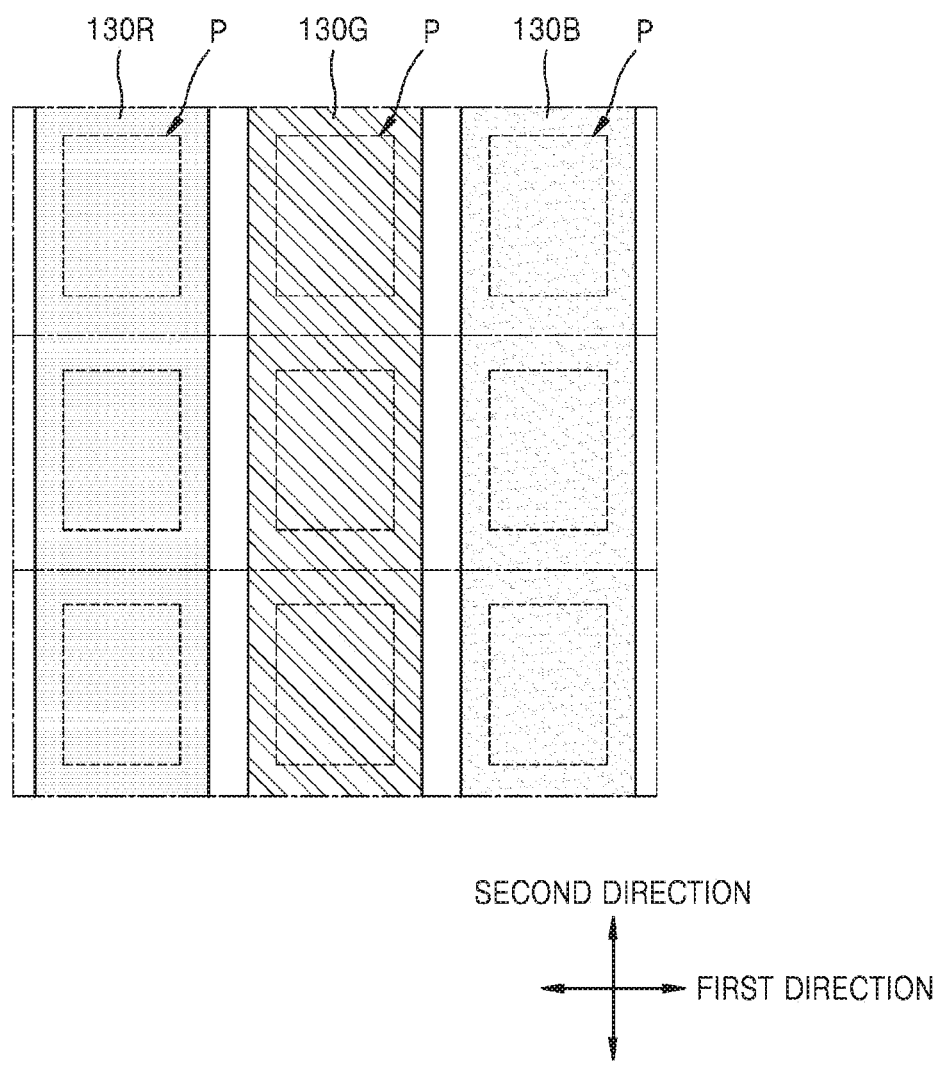
FIG. 1 is a plan view illustrating the pixel arrangement of a liquid crystal display apparatus constructed according to an exemplary embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings.

Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a plan view illustrating pixel arrangement of a liquid crystal display apparatus according to an exemplary embodiment of the invention.

Referring to FIG. 1, the liquid crystal display apparatus includes a plurality of pixels P arranged in a matrix configuration along a first direction D1 and a second direction D2. The plurality of pixels P may include red, green, and blue pixels P. Pixels P of the same color may be disposed along the second direction D2.

First to third color filter layers 130R, 130G, and 130B may be disposed on the plurality of pixels P. The first color filter layer 130R may be a red color filter converting incident light into a red light. The first color filter layer 130R may correspond to red pixels and extend substantially linearly. The second color filter layer 130G may be a green color filter converting incident light into a green light. The second color filter layer 130G may correspond to green pixels and extend substantially linearly. The third color filter layer 130B may be a blue color filter converting incident light into a blue light. The third color filter layer 130B may correspond to blue pixels and extend substantially linearly.

Each pixel P includes a thin film transistor formed on a substrate, and a liquid crystal capacitor electrically connected to the transistor. The first to third color filter layers 130R, 130G, and 130B are disposed on the same substrate on which the thin film transistor is formed. For example, the first to third color filter layers 130R, 130G, and 130B may be disposed between the thin film transistor and a pixel electrode of the liquid crystal capacitor, and include a hole for electrically connecting the thin film transistor to the pixel electrode of the liquid crystal capacitor.

Figure 2:
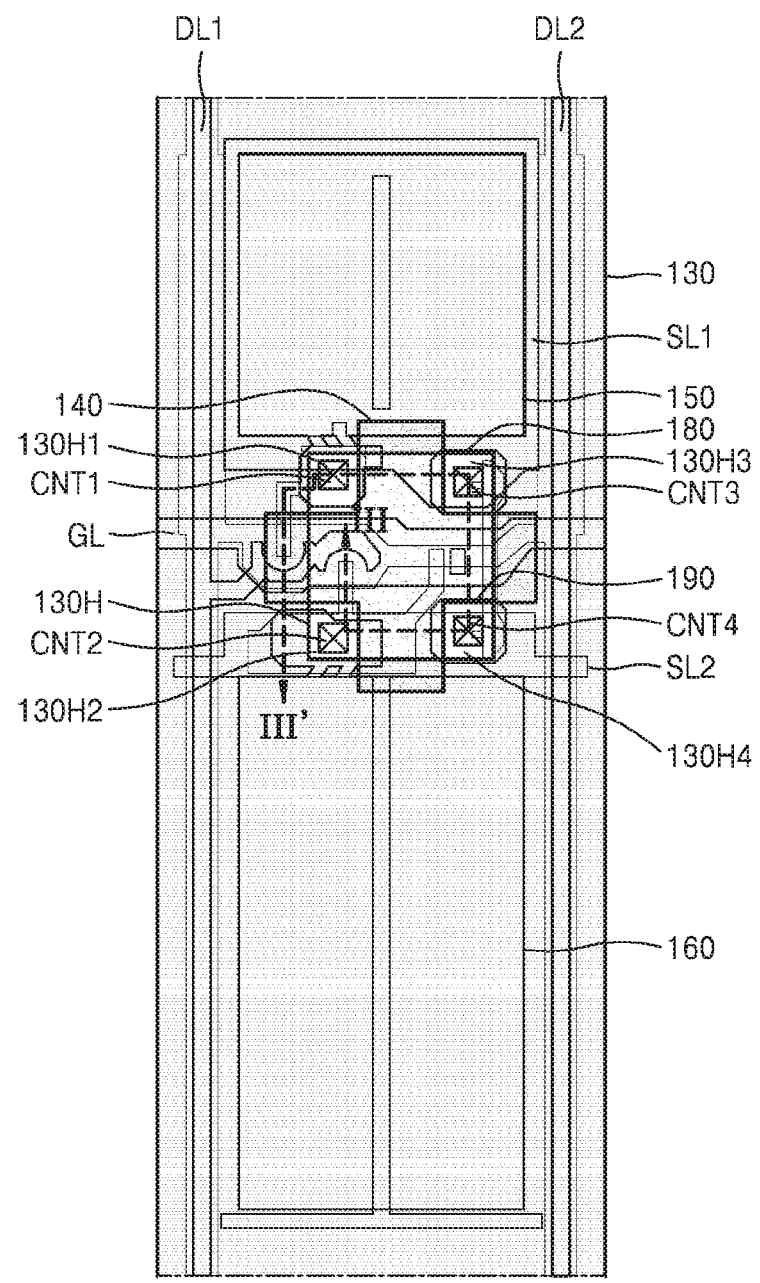
FIG. 2 is an extracted plan view illustrating one pixel according to an exemplary embodiment of the invention.
Figure 3:
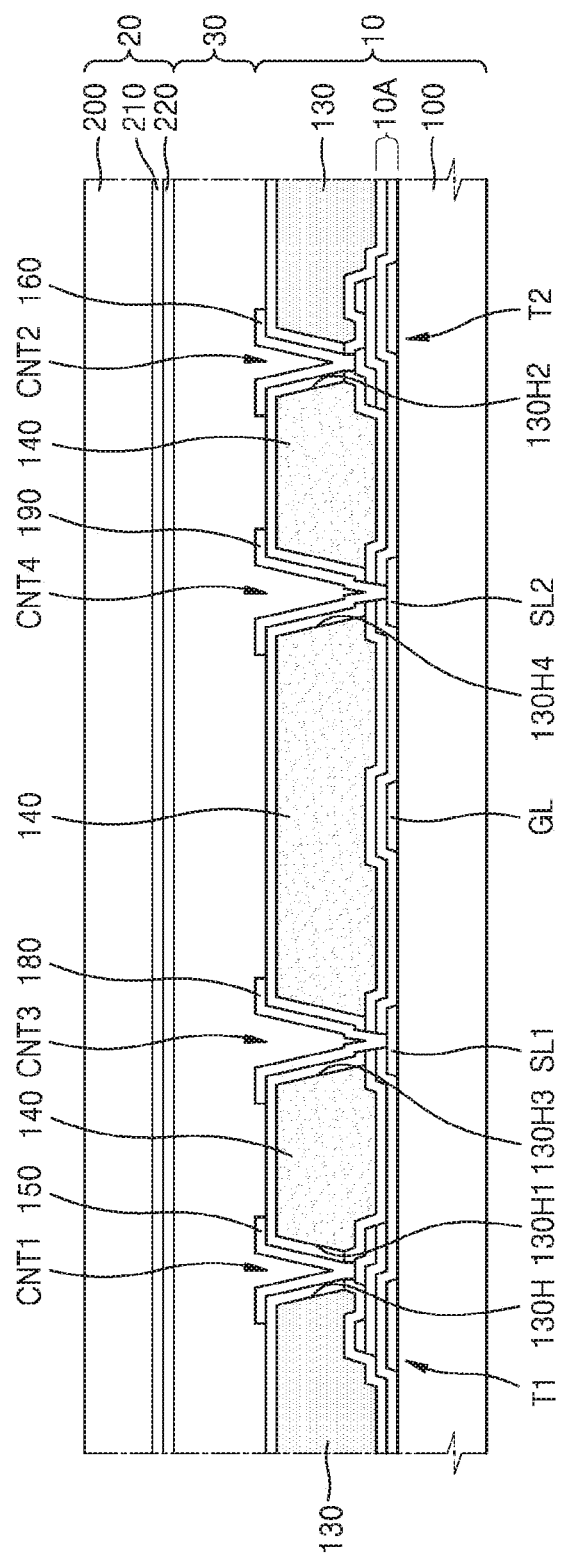
FIG. 3 is a cross-sectional view of the pixel taken along line of FIG. 2.
Figure 4:
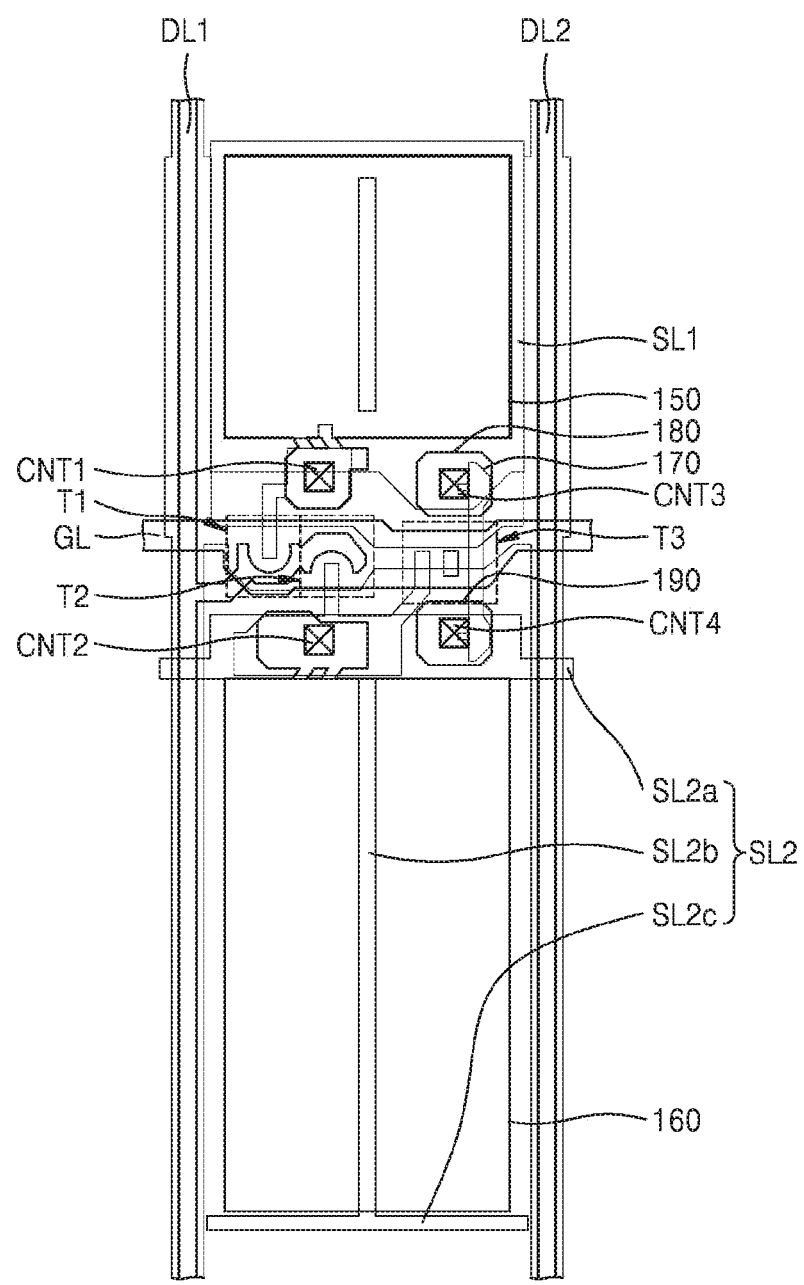
FIG. 4 is an extracted plan view illustrating an arrangement of a transistor and a pixel electrode of a liquid crystal capacitor of FIG. 2.
Figure 5:
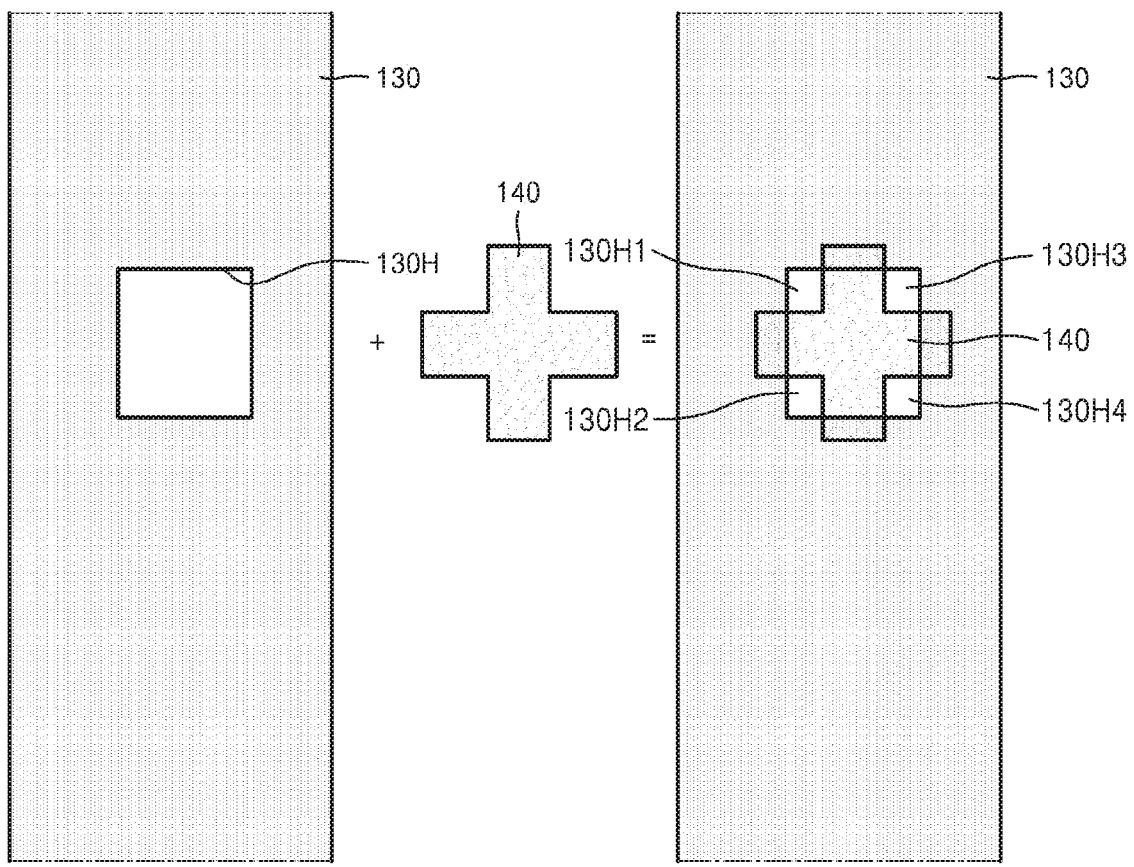
FIG. 5 is a plan view illustrating a color filter layer and a partition wall of FIG. 2.

FIG. 2 is an extracted plan view illustrating one pixel according to an exemplary embodiment of the invention, FIG. 3 is a cross-sectional view of the pixel taken along line III-III' of FIG. 2, FIG. 4 is an extracted plan view illustrating an arrangement of a transistor and a pixel electrode of a liquid crystal capacitor of FIG. 2, and FIG. 5 is a plan view illustrating a color filter layer and a partition wall of FIG. 2.

Referring to FIGS. 2, 3, and 4, a liquid crystal display apparatus includes a thin film transistor substrate 10 and a counterpart substrate 20 opposing each other, and a liquid crystal (LC) layer 30 disposed therebetween.

A gate line GL, and first and second data lines DL1 and DL2 are disposed on a first substrate 100. The gate line GL extends along a first direction, and the first data line DL1 and the second data line DL2 extend along a second direction crossing the first direction. First to third thin film transistors T1, T2, and T3 are disposed adjacent to the gate line GL between the first data line DL1 and the second data line DL2.

The gate line GL is electrically connected to a gate electrode of the first thin film transistor T1, a gate electrode of the second thin film transistor T2, and a gate electrode of the third thin film transistor T3. For example, a portion of the gate line GL forms the gate electrodes of the first to third thin film transistors T1, T2, and T3.

The first data line DL1 is electrically connected to a source electrode of the first thin film transistor T1 and a source electrode of a second thin film transistor T2.

The second data line DL2 is spaced apart from the first data line DL1 along the first direction. The second data line DL2 is electrically connected to thin film transistors (not shown) of a pixel (not shown) adjacent to the pixel illustrated in FIG. 2.

The first pixel electrode 150 is disposed adjacent to the second pixel electrode 160 with the gate line GL disposed therebetween. In a plan view, the first pixel electrode 150 is disposed above the gate line GL between the first data line DL1 and the second data line DL2, and the second pixel electrode 160 is disposed below the gate line GL between the first data line DL1 and the second data line DL2.

In an exemplary embodiment of the invention, the first pixel electrode 150 is a high pixel electrode and is electrically connected to the first thin film transistor T1. The first pixel electrode 150 may be electrically connected to a drain electrode of the first thin film transistor T1 via a first contact portion CNT1. The second pixel electrode 160 is a low pixel electrode and is electrically connected to the second thin film transistor T2. The second pixel electrode 160 may be electrically connected to a drain electrode of the second thin film transistor T2 via a second contact portion CNT2.

A first voltage may be applied to the first pixel electrode 150, and a second voltage lower than the first voltage may be applied to the second pixel electrode 160. A portion of a pixel corresponding to the first pixel electrode 150 may be driven as a high pixel, and a portion of the pixel corresponding to the second pixel electrode 160 may be driven as a low pixel, depending on the first voltage and the second voltage.

Although not shown, the first pixel electrode 150 and the second pixel electrode 160 may have a slit pattern. For example, the first pixel electrode 150 and the second pixel electrode 160 may include a horizontal stem line and a vertical stem line crossing each other, and a plurality of branch lines connected to the horizontal stem line and the vertical stem line.

A first storage line SL1 is disposed between the first data line DL1 and the second data line DL2. The first storage line SL1 is a high storage line and may be disposed adjacent to the first pixel electrode 150. For example, the first storage line SL1 may have a circular shape, which is a closed curve, and may be disposed along an outer periphery of the first pixel electrode 150. The first storage line SL1 may have other shapes. For example, the first storage line SL1 may have the same shape as that of a second storage line SL2, which will be described in more detail below.

The first storage line SL1 is electrically connected to a source electrode of the third thin film transistor T3, and connected to a first metallic layer 180 via a third contact portion CNT3.

The second storage line SL2 is disposed between the first data line DL1 and the second data line DL2. The second storage line SL2 is a low storage line and may be disposed adjacent to the second pixel electrode 160. The second storage line SL2 may have an "H" shape. For example, the second storage line SL2 may include a first part SL2a substantially parallel to a gate electrode, a second part SL2b vertically extending with respect to the first part SL2a, and a third part SL2c connected to the second part SL2b and substantially parallel to the first part SL2a. It is contemplated that, however, although the second storage line SL2 is described as having an "H" shape. But, other shapes may be employed as well.

The second storage line SL2 is electrically connected to a connection electrode 170. The second storage line SL2 is connected to a second metallic layer 190 via a fourth contact portion CNT4.

Referring to FIGS. 2, 3, and 4, the color filter layer 130 is disposed on a pixel circuit layer 10a including the first to third thin film transistors T1, T2, and T3, and the first and second storage lines SL1 and SL2. The color filter layer 130 is disposed below the first and second pixel electrodes 150 and 160, and the first and second metallic layers 180 and 190. The first and second pixel electrodes 150 and 160, and the first and second metallic layers 180 and 190 may include the same material and may be disposed on the same layer.

The color filter layer 130 includes pigment of a first color. For example, the color filter layer 130 may include pigment having one of red, green, and blue colors.

The color filter layer 130 includes first to fourth sub-holes 130H1, 130H2, 130H3, and 130H4 corresponding to the first to fourth contact portions CNT1, CNT2, CNT3, and CNT4, respectively. The first sub-hole 130H1 corresponds to the first contact portion CNT1, the second sub-hole 130H2 corresponds to the second contact portion CNT2, the third sub-hole 130H3 corresponds to the third contact portion CNT3, and the fourth sub-hole 130H4 corresponds to the fourth contact portion CNT4.

The first to fourth sub-holes 130H1, 130H2, 130H3, and 130H4 are surrounded by the through-hole 130H of the color filter layer 130, and are separated from each other by a partition wall 140. The partition wall 140 may have a "+" shape as illustrated in FIGS. 2 and 5, and one or more of the end portions of the partition wall 140 may overlap an end portion of the color filter layer 130 adjacent to the through-hole 130H and surrounding the through-hole 130H.

The first to fourth sub-holes 130H1, 130H2, 130H3, and 130H4 may be formed by, for example, forming the through-hole 130H in the color filter layer 130, and then separately forming the partition wall 140 spatially dividing the through-hole 130H as illustrated in FIG. 5.

As a comparison example, four holes corresponding to the first to fourth contact portions CNT1, CNT2, CNT3, and CNT4 of the exemplary embodiment may be formed through exposure and developing processes that use a mask, after forming the color filter layer 130. During the exposure process that uses the mask, an unintended portion may be exposed (over exposure) by diffraction of light, etc., or an intended portion may not be exposed (non-exposure). In this case, controlling the sizes of holes corresponding to the first to fourth contact portions CNT1, CNT2, CNT3, and CNT4 may be difficult. Especially, when the size of the pixel P is small to obtain a high resolution, it may be difficult to control the sizes of holes corresponding to the first to fourth contact portions CNT1, CNT2, CNT3, and CNT4.

However, according to an exemplary embodiment of the invention, after a relatively large-sized through-hole 130H is formed, the first to fourth sub-holes 130H1, 130H2, 130H3, and 130H4 are formed by patterning the through-hole 130H via the partition wall 140 and dividing the through-hole 130H into a plurality of spaces, such that it is easy to control the sizes of the first to fourth sub-holes 130H1, 130H2, 130H3, and 130H4 corresponding to the first to fourth contact portions CNT1, CNT2, CNT3, and CNT4. Furthermore, such methods may prevent the occurrence of the over-exposure or non-exposure described above.

The partition wall 140 may include pigment of a second color. For example, the partition wall 140 may include pigment of a color different from the color of the color filter layer 130. According to an exemplary embodiment, if the color filter layer 130 includes red pigment, the partition wall 140 may include green or blue pigment.

The counterpart substrate 20 is disposed to oppose the thin film transistor substrate 10 with the LC layer 30 disposed between the counterpart substrate 20 and the thin film transistor substrate 10. A black matrix 220 and a common electrode 210 may be disposed on a second substrate 200 of the counterpart substrate 20.

Although FIG. 3 illustrates that the black matrix 220 and the common electrode 210 are disposed on the counterpart substrate 20, other arrangements are possible. For example, the common electrode 210 may be disposed over the thin film transistor substrate 10. Alternatively, both the black matrix 220 and the common electrode 210 may be disposed on the thin film transistor substrate 10.

FIGS. 6A to 6E are cross-sectional views illustrating a process of manufacturing a thin film transistor substrate according to an exemplary embodiment of the invention.

Figure 6A:
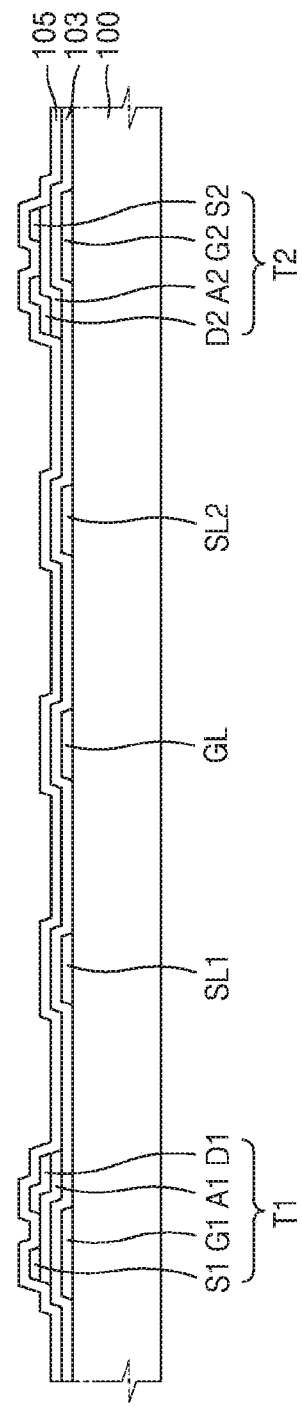
FIG. 6A, FIG. 6B, FIG. 6C, FIG. 6D, and FIG. 6E are cross-sectional views illustrating a method of manufacturing a thin film transistor substrate according to the principles of the invention.

Referring to FIGS. 2, 4, and 6A, a gate line GL, a first data line DL1, a second data line DL2, first to third thin film transistors T1, T2, and T3, and first and second storage lines SL1 and SL2 electrically connected thereto are formed on the first substrate 100.

First, after a metallic layer (not shown) is formed over the first substrate 100, the gate line GL and the first and second storage lines SL1 and SL2 are formed by patterning the metallic layer. The gate line GL extends in the first direction, and a portion of the gate line GL forms gate electrodes of the first to third thin film transistors T1, T2, and T3. FIG. 6A illustrates gate electrodes G1 and G2 of the first and second thin film transistors T1 and T2.

The first storage line SL1 may be formed above the gate line GL, and the second storage line SL2 may be formed below the gate line GL in plan view, as illustrated in FIG. 2.

Next a gate insulating layer 103 is formed on the first substrate 100. The gate insulating layer 103 may include an inorganic material including a silicon oxide and/or a silicon nitride. Although not shown, the gate insulating layer 103 may include a hole exposing the first storage line SL1 and the second storage line SL2.

Next, after a semiconductor material layer (not shown) and a metallic layer (not shown) are formed, semiconductor layers, source electrodes and drain electrodes of the first to third thin film transistors T1, T2, and T3, the first and second data lines DL1 and DL2, and a connection electrode 170 are formed by patterning the semiconductor material layer and the metallic layer. The semiconductor material layer may include a metallic oxide, such as amorphous silicon (a-Si), poly-Si, and indium gallium zinc oxide (IGZO). A portion of the first data line DL1 may function as the source electrodes of the first and second thin film transistors T1 and T2. FIG. 6A illustrates semiconductor layers A1 and A2, source electrodes S1 and S2, and drain electrodes D1 and D2 of the first and second thin film transistors T1 and T2. Although not shown in FIG. 6A, a connection electrode 170 (see FIG. 4) is electrically connected to the first and second storage lines SL1 and SL2 via a hole included in the gate insulating layer 103.

Next, a first passivation layer 105 is formed on the gate insulating layer 103. The first passivation layer 105 may include an inorganic material including a silicon oxide and/or a silicon nitride. In another exemplary embodiment, the first passivation layer 105 may include an organic material, such as an acryl resin, a silicon resin, and a polyimide resin, but the embodiment is not limited thereto.

Figure 6B:
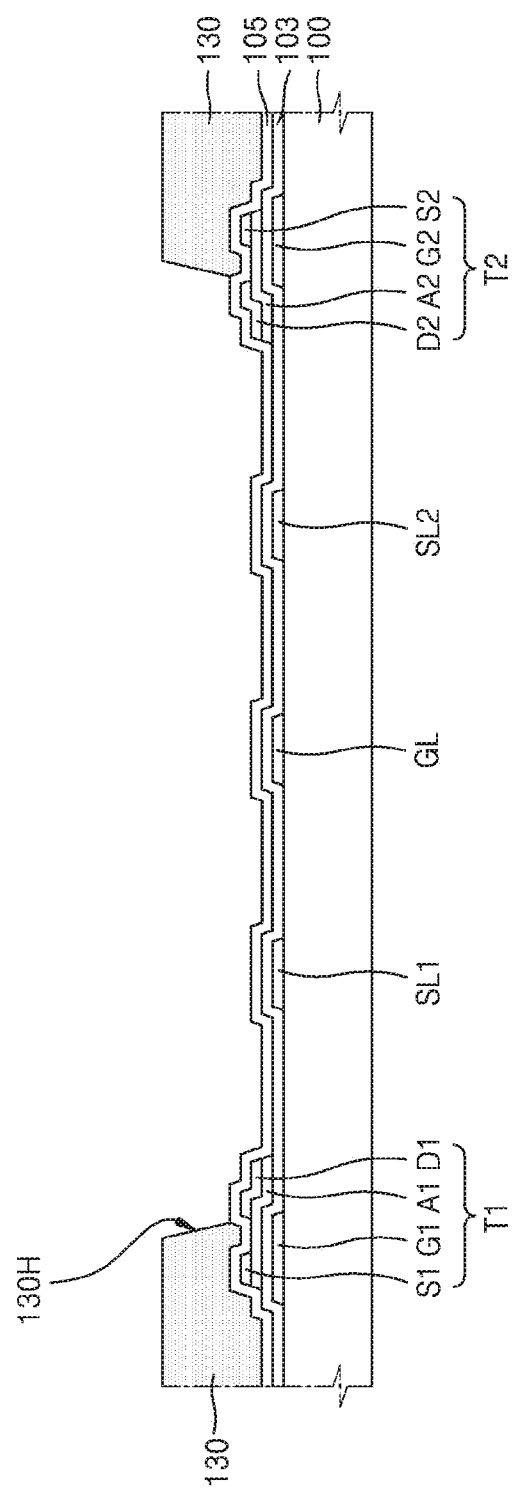

Referring to FIGS. 2 and 6B, the color filter layer 130 including the through-hole 130H is formed by forming a photosensitive resist including pigment of a first color on the first passivation layer 105, and performing exposure and developing processes that use a mask.

Figure 6C:
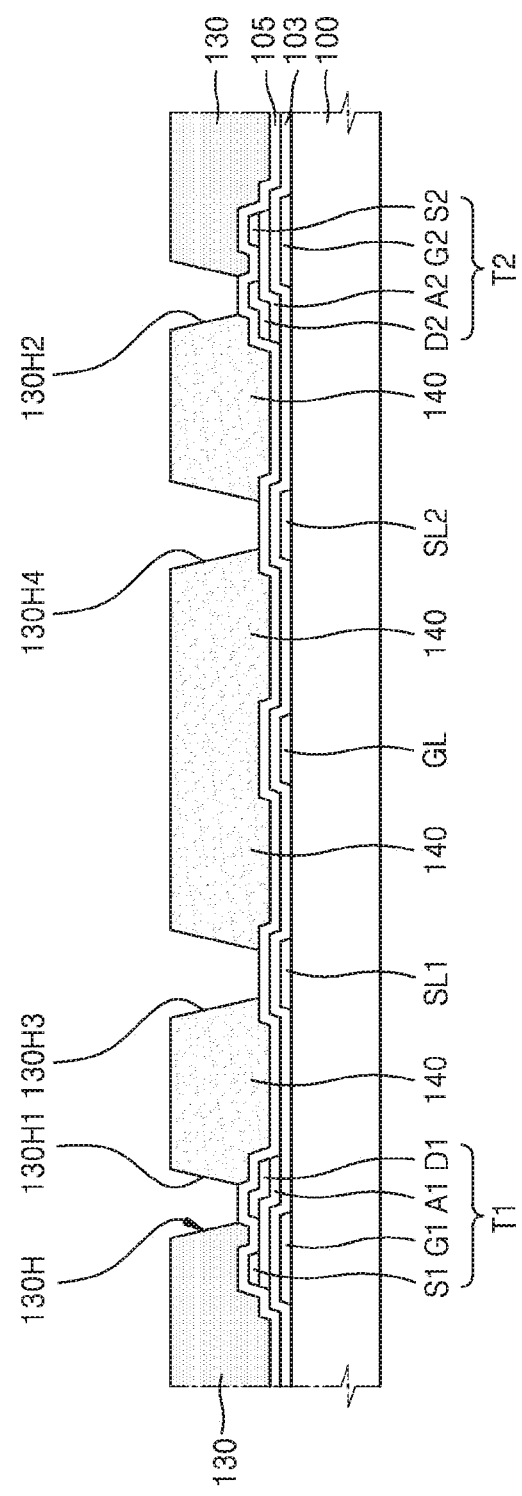

Referring to FIGS. 2 and 6C, the partition wall 140 is formed inside the through-hole 130H. The partition wall 140 may be formed together with a color filter layer of another pixel, during the process of forming the color filter layer (not shown) of another pixel. In this manner, the partition wall 140 may include pigment of a color different from the first color of the pigment included in the color filter layer 130.

As illustrated in FIG. 2, the partition wall 140 may have a "+" shape. The through-hole 130H is divided into the first to fourth sub-holes 130H1, 130H2, 130H3, and 130H4 by the partition wall 140.

Figure 6D:
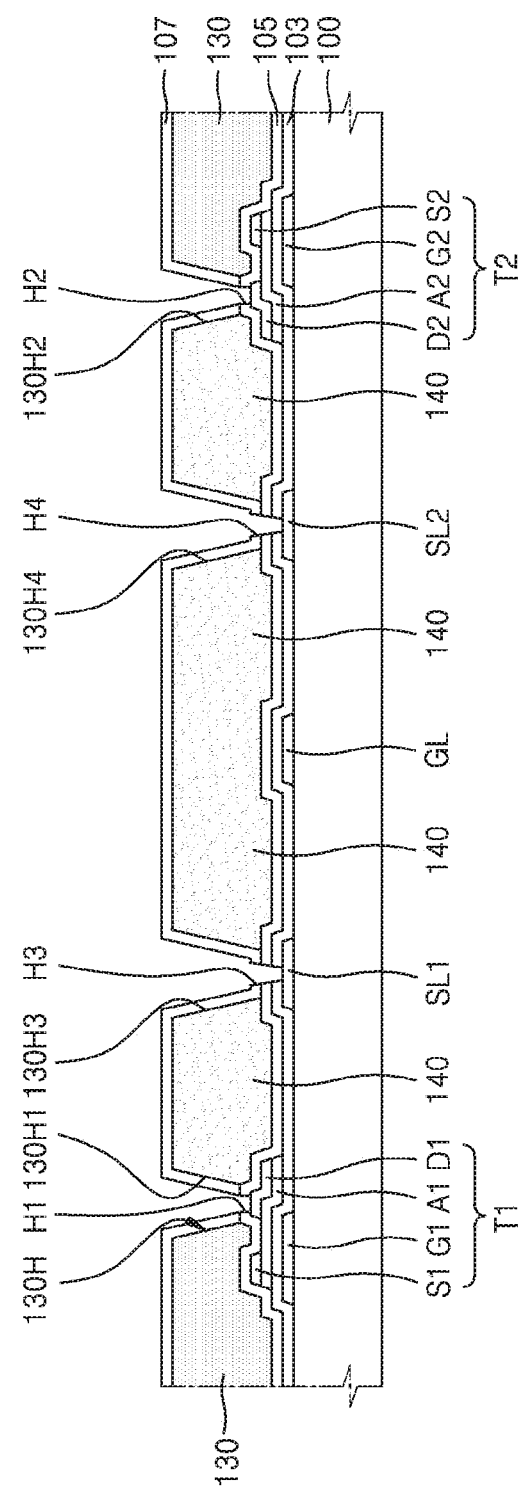

Referring to FIGS. 2 and 6D, a second passivation layer 107 is formed on the color filter layer 130 and the partition wall 140. The second passivation layer 107 may include an inorganic material including a silicon oxide and/or a silicon nitride. In another exemplary embodiment, the second passivation layer 107 may include an organic material, such as an acryl resin, a silicon resin, and a polyimide resin, but the embodiment is not limited thereto.

Next, third to sixth holes H1, H2, H3, and H4 passing through the first and second passivation layers 105 and 107 are formed by etching portions of the first and second passivation layers that correspond to the first to fourth sub-holes 130H1, 130H2, 130H3, and 130H4.

A drain electrode of the first thin film transistor T1 is exposed via the first sub-hole 130H1 and the third hole H1, and a drain electrode of the second thin film transistor T2 is exposed via the second sub-hole 130H2 and the fourth hole H2. The first storage line SL1, for example, a portion of which is connected to the connection electrode 170, is exposed via the third sub-hole 130H3 and the fifth hole H3. The second storage line SL2, for example, a portion of which is connected to the connection electrode 170, is exposed via the fourth sub-hole 130H4 and the sixth hole H4.

Figure 6E:
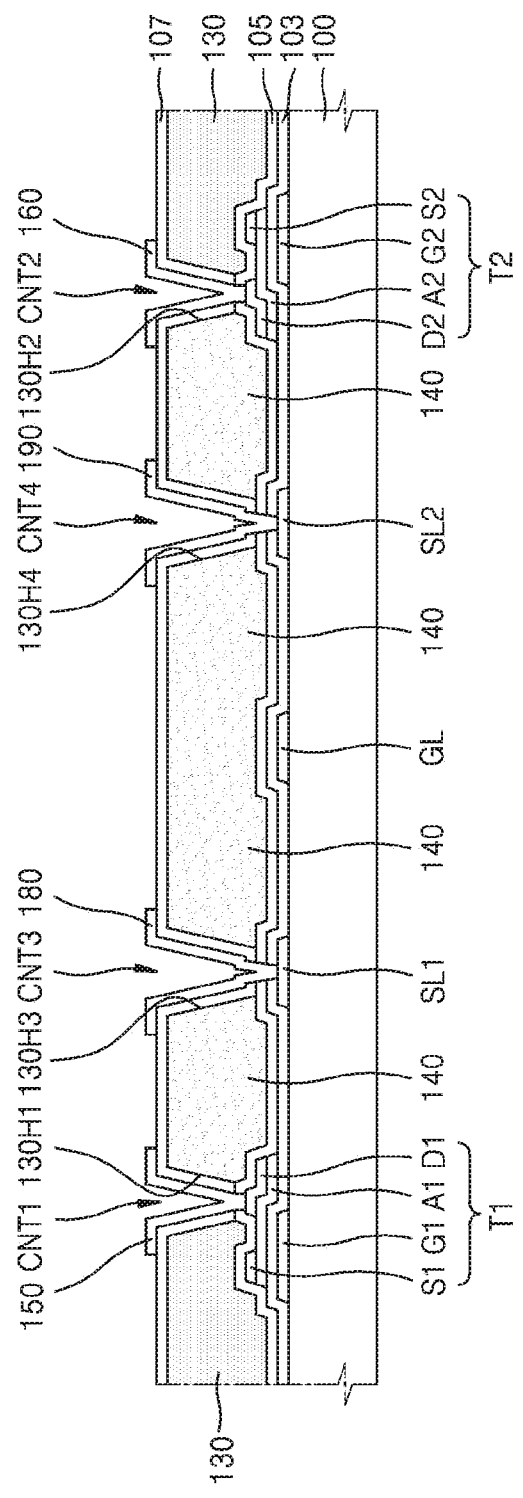

Referring to FIGS. 2, 4, and 6E, the first and second pixel electrodes 150 and 160, and the first and second metallic layers 180 and 190 are formed by forming a conductive layer (not shown) over the second passivation layer 107 and patterning the same.

The conductive layer may be a transparent conductive oxide (TCO) layer, such as an indium tin oxide (ITO) layer and an indium zinc oxide (IZO) layer.

The first pixel electrode 150 is connected to the first thin film transistor T1 exposed via the first sub-hole 130H1 and the third hole H1, and the second pixel electrode 160 is connected to the second thin film transistor T2 exposed via the second sub-hole 130H2 and the fourth hole H2. The first metallic layer 180 may be connected to the first storage line SL1 by contacting the connection electrode 170 exposed via the third sub-hole 130H3 and the fifth hole H3. The second metallic layer 190 may be connected to the second storage line SL2 by contacting the connection electrode 170 exposed via the fourth sub-hole 130H4 and the sixth hole H4.

According to the above manufacturing method, after the relatively large-sized through-hole 130H is formed, the through-hole 130H is divided into the first to fourth sub-holes 130H1, 130H2, 130H3, and 130H4 by patterning the partition wall 140, such that it is easy to control the sizes of the first to fourth sub-holes 130H1, 130H2, 130H3, and 130H4, as described with reference to FIG. 5.

Figure 7:
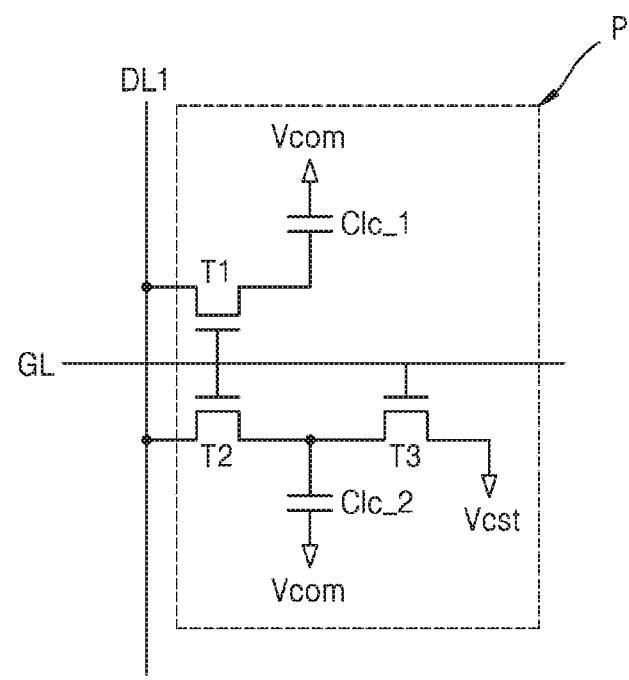
FIG. 7 is an equivalent circuit diagram of a pixel according to an exemplary embodiment of the invention described with reference to FIGS. 2 to 6E.

FIG. 7 is an equivalent circuit diagram of the pixel described with reference to FIGS. 2 to 6E, according to an exemplary embodiment of the invention.

A pixel P includes a high pixel LC capacitor Clc-1 and a low pixel LC capacitor Clc-2. A gate electrode and a source electrode of the first thin film transistor T1 are respectively connected to the date line GL and the first data line DL1, and a drain electrode of the first thin film transistor T1 is connected to the high pixel LC capacitor Clc-1. The high LC capacitor Clc-1 includes the first pixel electrode 150 (see FIGS. 2 and 3), the LC layer 30 (see FIG. 3), and the common electrode 210 (see FIG. 3) to which a common voltage Vcom is applied.

A gate electrode and a source electrode of the second thin film transistor T2 are respectively connected to the date line GL and the first data line DL1, and a drain electrode of the second thin film transistor T2 is connected to the low pixel LC capacitor Clc-2. The low LC capacitor Clc-2 includes the second pixel electrode 160 (see FIGS. 2 and 3), the LC layer 30 (see FIG. 3), and the common electrode 210 (see FIG. 3) to which a common voltage Vcom is applied.

A storage voltage Vcst is applied to a source electrode of the third thin film transistor T3. The storage voltage Vcst is applied to the first and second storage lines SL1 and SL2 (see FIGS. 2 and 3), and the first storage line SL1 may be connected to a source electrode of the third thin film transistor T3.

Although not shown, the first pixel electrode 150 and the first storage line SL1 may form a first storage capacitor, and the second pixel electrode 160 and the second storage line SL2 may form a second storage capacitor.

The connection structure of pixel P constructed according to the principles of the invention, in which the color filter layer 130 includes the through-hole 130H, and the plurality of sub-holes 130H1, 130H2, 130H3, and 130H4 are separated by the partition wall 140 disposed inside the through-hole 130H, as described above, also may be applicable to embodiments including a plurality of pixel electrodes, for example, a high pixel electrode and a low pixel electrode.

Thus, according to another exemplary embodiment of the invention, the structure of the color filter layer 130 having the through-hole 130H and the partition wall 140 dividing the through-hole 130H into a plurality of sub-holes, is applicable to a plurality of pixels. Detailed description thereof is made below with reference to FIGS. 8 and 9.

Figure 8:
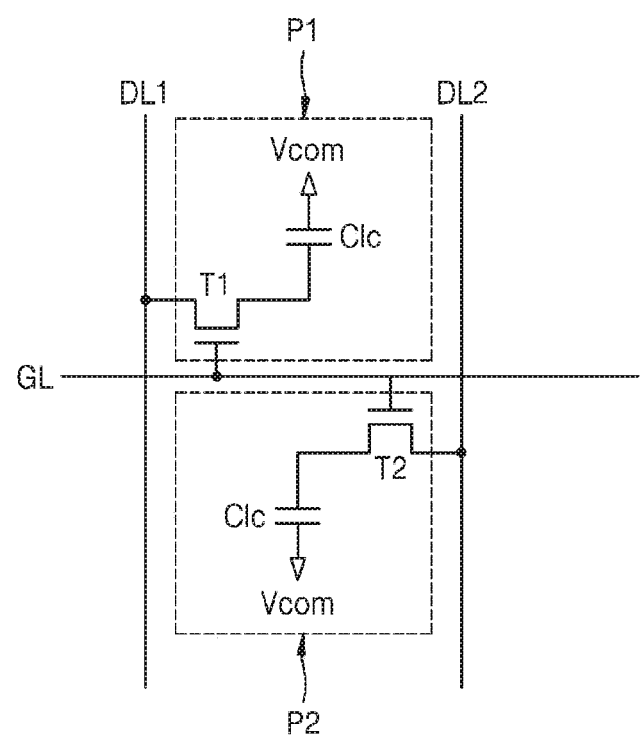
FIG. 8 is an equivalent circuit diagram of pixels according to another exemplary embodiment of the invention.
Figure 9:
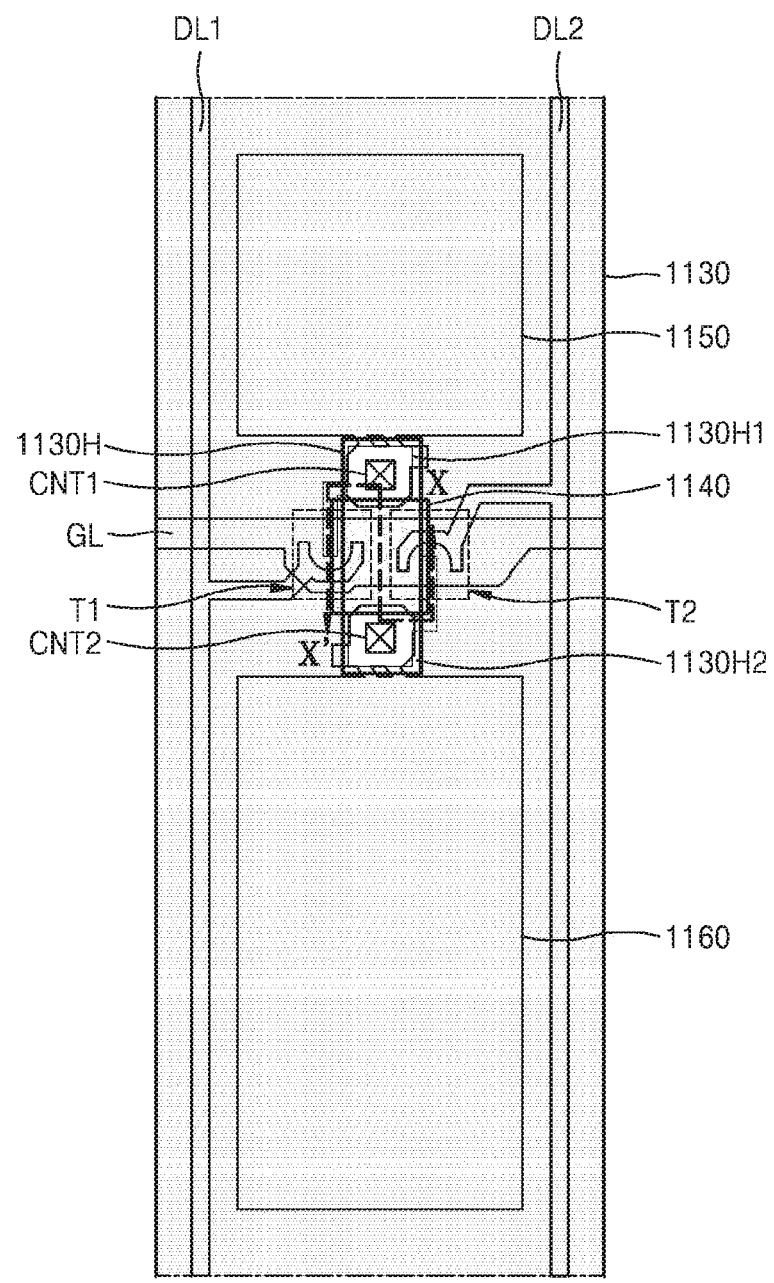
FIG. 9 is a plan view illustrating pixels according to yet another exemplary embodiment of the invention.
Figure 10:
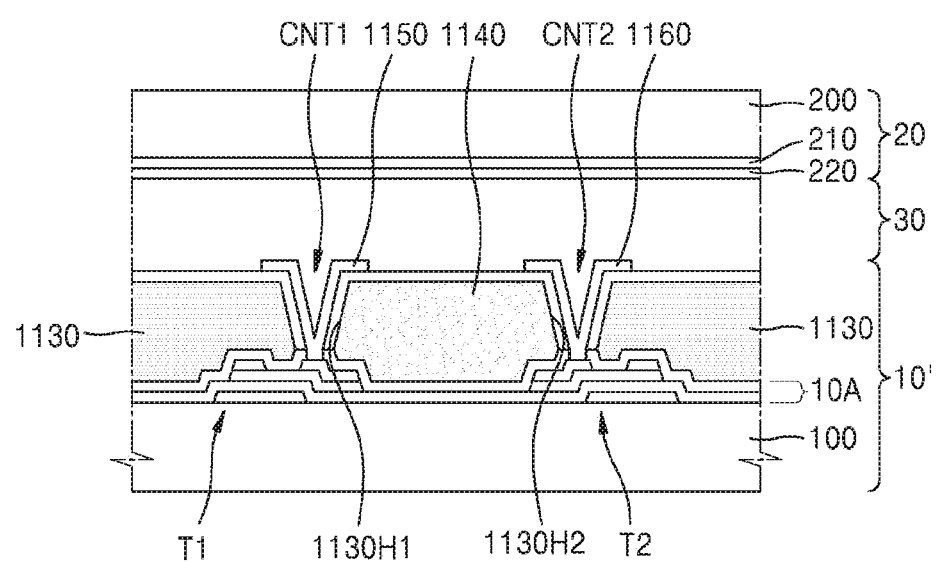
FIG. 10 is a cross-sectional view of a pixel taken along line X-X' of FIG. 9.

FIG. 8 is an equivalent circuit diagram of pixels constructed according to another exemplary embodiment of the invention, FIG. 9 is a plan view illustrating pixels constructed according to another exemplary embodiment of the invention, and FIG. 10 is a cross-sectional view of pixels taken along line X-X' of FIG. 9.

Referring to FIGS. 8 to 10, the gate line GL and the first and second data lines DL1 and DL2 crossing each other are disposed on the first substrate 100 of a thin film transistor substrate 10'.

The gate line GL is electrically connected to a gate electrode of the first thin film transistor T1 and a gate electrode of the second thin film transistor T2. For example, a portion of the gate line GL forms the gate electrodes of the first and second thin film transistors T1 and T2.

The first data line DL1 is connected to a source electrode of the first thin film transistor T1, and the second data line DL2 is connected to a source electrode of the second thin film transistor T2. Unlike the exemplary embodiment described with reference to FIG. 7, data signals applied to the first thin film transistor T1 and the second thin film transistor T2 are different from each other.

As illustrated in FIGS. 8 and 9, a first pixel electrode 1150 and a second pixel electrode 1160 are disposed between a gate line GL extending in a first direction, and first and second data lines DL1 and DL2 extending in a second direction. The first pixel electrode 1150 corresponds to a pixel P1 (referred to as a first pixel) disposed above the gate line GL in plan view, and the second pixel electrode 1160 corresponds to a pixel P2 (referred to as a second pixel) disposed below the gate line GL in plan view.

Although not shown, the first pixel electrode 1150 and the second pixel electrode 1160 may have a slit pattern. For example, the first pixel electrode 1150 and the second pixel electrode 1160 may include a horizontal stem line and a vertical stem line crossing each other, and a plurality of branch lines connected to the horizontal stem line and the vertical stem line.

The gate electrode and the source electrode of the first thin film transistor T1 are respectively connected to the gate line GL and the first data line DL1, and a drain electrode of the first thin film transistor T1 is connected to the pixel electrode 1150 of an LC capacitor Clc of the first pixel P1 via a first contact portion CNT1.

The gate electrode and the source electrode of the second thin film transistor T2 are respectively connected to the gate line GL and the second data line DL2, and a drain electrode of the second thin film transistor T2 is connected to the pixel electrode 1160 of an LC capacitor Clc of the second pixel P2 via a second contact portion CNT2.

A color filter layer 1130 is disposed on a pixel circuit layer including the first and second thin film transistors T1 and T2, and disposed below the first and second pixel electrodes 1150 and 1160. The color filter layer 1130 includes red, green, or blue pigment.

The color filter layer 1130 includes first and second sub-holes 1130H1 and 1130H2 corresponding to the first and second contact portions CNT1 and CNT2. The first sub-hole 1130H1 corresponds to the first contact portion CNT1, and the second sub-hole 1130H2 corresponds to the second contact portion CNT2.

The first and second sub-holes 1130H1 and 1130H2 are surrounded by the through-hole 1130H of the color filter layer 1130, and are separated from each other by a partition wall 1140. The partition wall 1140 may have an elongated shape, such as a rectangular bar, and one or more end portions of the partition wall 1140 may overlap an end portion of the color filter layer 1130 that is adjacent to the through-hole 1130H, as illustrated in FIG. 9.

As described with reference to FIG. 5, the first and second sub-holes 1130H1 and 1130H2 may be formed by forming the color filter layer 1130 having the through-hole 1130H, and then forming the partition wall 1140 spatially dividing the through-hole 1130H.

The partition wall 1140 may include pigment. For example, the partition wall 1140 may include pigment of a color different from the color of the color filter layer 1130. In an exemplary embodiment, when the color filter layer 1130 has a red color, the partition wall 1140 may have a green or blue color.

The counterpart substrate 20 is disposed to oppose the thin film transistor substrate 10' with the LC layer 30 disposed between the counterpart substrate 20 and the thin film transistor substrate 10'. According to an exemplary embodiment, the black matrix 220 and the common electrode 210 may be disposed on the second substrate 200 of the counterpart substrate 20. Alternatively, the black matrix 220 and/or the common electrode 210 may be disposed over the thin film transistor substrate 10'.

Since the exemplary embodiment described with reference to FIGS. 9 and 10 is formed by using the substantially same process as the manufacturing process described with reference to FIGS. 6A to 6E, except that the second thin film transistor T2 connected to the second pixel electrode 1160 is connected to a different data line, that is, a second data line DL2, as compared to a data line to which the first thin film transistor T1 connected with the first pixel electrode 1150 is connected to, and thus, repeated description of the substantially the same process is unnecessary and will be omitted.

Although certain exemplary embodiments and implementations have been described herein, other exemplary embodiments and modifications will be apparent from this description. Accordingly, the inventive concept is not limited to such embodiments, but rather only by the scope of the appended claims and various modifications and equivalent arrangements apparent to the skilled artisan.

What is claimed is:

1. A thin film transistor substrate, comprising:
a gate line extending in a first direction;
a first data line and a second data line extending in a second direction crossing the first direction;
a first thin film transistor electrically connected to the gate line and the first data line;
a second thin film transistor adjacent to the first thin film transistor;
a color filter layer over the first thin film transistor and the second thin film transistor, the color filter layer having a first color and a through-hole formed therein;
a first pixel electrode over the color filter layer and electrically connected to the first thin film transistor;
a second pixel electrode over the color filter layer and electrically connected to the second thin film transistor; and
a partition wall having a second color that is different from the first color, the partition wall extending along at least one direction within the through-hole to spatially divide the through-hole into at least two sub-holes and beyond the through-hole to partially overlap an upper surface of the color filter layer, the at least two sub-holes are separated from each other by the partition wall,
wherein:
the first pixel electrode is connected to the first thin film transistor exposed via a first one of the at least two sub-holes; and
the second pixel electrode is connected to the second thin film transistor exposed via a second one of the at least two sub-holes.

2. The thin film transistor substrate of claim 1, wherein an end portion of the partition wall overlaps an end portion of the color filter layer that is adjacent to the through-hole.

3. The thin film transistor substrate of claim 1, wherein the second thin film transistor is electrically connected to the gate line and the second data line.

4. The thin film transistor substrate of claim 1, wherein:
the first pixel electrode is disposed adjacent to the gate line between the first data line and the second data line;
the second pixel electrode is disposed adjacent to the gate line between the first data line and the second data line in a position adjacent to the first pixel electrode; and
the gate line is disposed between the first pixel electrode and the second pixel electrode.

5. The thin film transistor substrate of claim 1, wherein the second thin film transistor is electrically connected to the gate line and the first data line.

6. The thin film transistor substrate of claim 5, wherein:
the first pixel electrode is configured to be applied with a first voltage; and
the second pixel electrode is configured to be applied with a second voltage lower than the first voltage.

7. The thin film transistor substrate of claim 6, further comprising:
a first storage line disposed below the color filter layer and adjacent to the first pixel electrode; and
a second storage line disposed below the color filter layer and adjacent to the second pixel electrode.

8. The thin film transistor substrate of claim 7, further comprising:
a first metallic layer disposed on the color filter layer and electrically connected to the first storage line; and
a second metallic layer disposed on the color filter layer and electrically connected to the second storage line.

9. The thin film transistor substrate of claim 8, wherein:
the through-hole further comprises a third sub-hole and a fourth sub-hole separated by the partition wall;
the first metallic layer is connected to the first storage line via the third sub-hole; and
the second metallic layer is connected to the second storage line via the fourth sub-hole.

10. A liquid crystal display apparatus, comprising:
a thin film transistor substrate comprising:
 a gate line extending in a first direction;
 a first data line and a second data line extending in a second direction crossing the first direction;
 a first thin film transistor electrically connected to the gate line and the first data line;
 a second thin film transistor adjacent to the first thin film transistor;
 a color filter layer over the first thin film transistor and the second thin film transistor, the color filter layer having a first color and a through-hole formed therein;
 a first pixel electrode over the color filter layer and electrically connected to the first thin film transistor;
 a second pixel electrode over the color filter layer and electrically connected to the second thin film transistor; and
 a partition wall having a second color that is different from the first color and extending along two intersecting directions within the through-hole to spatially divide the through-hole into at least four sub-holes, the at least four sub-holes are separated from each other by the partition wall,
a counterpart substrate facing the thin film transistor substrate; and
a liquid crystal layer disposed between the thin film transistor substrate and the counterpart substrate,
wherein:
the first pixel electrode is connected to the first thin film transistor exposed via a first one of the at least four sub-holes; and
the second pixel electrode is connected to the second thin film transistor exposed via a second one of the at least four sub-holes.

11. A thin film transistor substrate, comprising:
a gate line extending in a first direction;
a first data line and a second data line extending in a second direction crossing the first direction;
a first thin film transistor electrically connected to the gate line and the first data line;
a second thin film transistor adjacent to the first thin film transistor;
a color filter layer over the first thin film transistor and the second thin film transistor, the color filter layer having a first color and a through-hole formed therein;
a first pixel electrode over the color filter layer and electrically connected to the first thin film transistor;
a second pixel electrode over the color filter layer and electrically connected to the second thin film transistor; and
a partition wall partially overlapping the through-hole of the color filter layer such that the through-hole includes at least two sub-holes, each of the at least two sub-holes is located between a portion of the color filter layer and a portion of the partition wall,
wherein a color of the color filter is one of red, green, and blue, and a color of the partition wall is one of red, green, and blue different from the color of the color filter.

12. The thin film transistor substrate of claim 11, wherein:
- a first electrical connection between the first pixel electrode and the first thin film transistor is in a first one of the at least two sub-holes; and
- a second electrical connection between the second pixel electrode and the second thin film transistor is in a second one of the at least two sub-holes.

* * * * *